(12) United States Patent
Matsubara et al.

(10) Patent No.: US 7,827,784 B2
(45) Date of Patent: Nov. 9, 2010

(54) EXHAUST GAS CONTROL APPARATUS FOR INTERNAL COMBUSTION ENGINE AND METHOD OF CONTROLLING SAME

(75) Inventors: Takuji Matsubara, Nagoya (JP); Satoshi Yoshizaki, Susono (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 758 days.

(21) Appl. No.: 11/833,041

(22) Filed: Aug. 2, 2007

(65) Prior Publication Data
US 2008/0028746 A1 Feb. 7, 2008

(30) Foreign Application Priority Data
Aug. 3, 2006 (JP) .............................. 2006-212444

(51) Int. Cl.
*F01N 3/00* (2006.01)
(52) U.S. Cl. .............................. 60/297; 60/280; 60/285; 60/287; 60/291; 60/292; 123/90.15; 180/65.26; 180/65.31; 180/309
(58) Field of Classification Search .................. 60/280, 60/285, 287, 288, 291, 292, 295, 297, 324; 123/90.15; 180/65.26, 65.31, 309
See application file for complete search history.

(56) References Cited
U.S. PATENT DOCUMENTS 5,647,206 A * 7/1997 Yamamoto et al. ............ 60/297
6,286,306 B1 * 9/2001 Takakura et al. .............. 60/288
6,401,451 B1 * 6/2002 Yasui et al. .................... 60/277
6,560,959 B2 * 5/2003 Katsuta et al. ................. 60/284
6,763,655 B2 * 7/2004 Ueno et al. .................... 60/277
6,901,743 B2 * 6/2005 Asanuma et al. .............. 60/281

FOREIGN PATENT DOCUMENTS

| JP | 8-165920 | 6/1996 |
| JP | 2000-291494 | 10/2000 |
| JP | 2001-65375 | 3/2001 |
| JP | 2001-295637 | 10/2001 |
| JP | 2002-168169 | 6/2002 |
| JP | 2003-120348 | 4/2003 |

* cited by examiner

*Primary Examiner*—Binh Q Tran
(74) *Attorney, Agent, or Firm*—Oblon, Spivak, McClelland, Maier & Neustadt, L.L.P.

(57) ABSTRACT

An exhaust gas control apparatus for an internal combustion engine includes an exhaust gas purification catalyst device provided in an exhaust passage for the engine; an HC adsorption portion, provided in the exhaust passage, which adsorbs hydrocarbon in exhaust gas; a passage switching portion that selectively closes/opens a second passage bypassing the HC adsorption portion using an intake pipe negative pressure in the engine so that the exhaust gas flows in a first passage provided with the HC adsorption portion, or in the first passage and the second passage; and a control portion that controls the negative pressure so that the second passage is closed, when a predetermined condition is satisfied at the time of start of the engine. The control portion executes at least one of a control that advances the valve timing of an intake valve, and a control that reduces the opening amount of a throttle valve.

5 Claims, 5 Drawing Sheets

EXHAUST GAS CONTROL APPARATUS FOR INTERNAL COMBUSTION ENGINE AND METHOD OF CONTROLLING SAME

INCORPORATION BY REFERENCE

The disclosure of Japanese Patent Application No. 2006-212444 filed on Aug. 3, 2006, including the specification, drawings and abstract is incorporated herein by reference in its entirety.

BACKGROUND OF THE INVENTION

1. Field of the Invention

The invention relates to an exhaust gas control apparatus for an internal combustion engine, in which a flow passage for exhaust gas is switched between a passage in which an HC adsorption portion is provided, and a passage that bypasses the HC adsorption portion, to purify the exhaust gas, and a method of controlling the same.

2. Description of the Related Art

An apparatus that executes a control to switch a flow passage for exhaust gas using a switching valve is available. The apparatus executes the control so that the exhaust gas flows in a passage in which an HC adsorption portion (HC adsorption tube) is provided, or a passage that bypasses the HC adsorption portion. The HC adsorption portion adsorbs HC (hydrocarbon) in the exhaust gas. For example, Japanese Patent Application Publication No. 8-165920 (JP-A-8-165920) describes an exhaust gas control apparatus in which a flow passage for exhaust gas is switched between a flow passage in which an HC adsorption portion is provided, and an exhaust passage provided in parallel with the flow passage in which the HC adsorption portion is provided, using a negative pressure. In the exhaust gas control apparatus, when an engine is cold after the engine starts, the exhaust gas is directed to flow in the flow passage in which the HC adsorption portion is provided.

As a technology for ensuring the startability of an engine when the engine is cold, the following technology is available. Japanese Patent Application Publication No. 2001-65375 (JP-A-2001-65375) describes the technology in which, in an internal combustion engine for a hybrid system, when the engine is cold, the amount of intake air is increased by advancing the opening timing of an intake valve so that an increase in generated torque is promoted, and the startability is improved.

However, in the technology described in the publication No. 8-165920, when the engine is cold, an appropriate negative pressure is not obtained, and the switching valve does not completely close the exhaust passage in which the HC adsorption portion is not provided. Therefore, there is a possibility that HC may be discharged. In the technology described in the publication No. 2001-65375 as well, when the engine is cold, it is not possible to reliably generate the negative pressure required for making the switching valve completely close the exhaust passage in which the HC adsorption portion is not provided.

SUMMARY OF THE INVENTION

A first aspect of the invention relates to an exhaust gas control apparatus for an internal combustion engine, which includes an exhaust gas purification catalyst device provided in an exhaust passage for the internal combustion engine; an HC adsorption portion, provided in the exhaust passage, which adsorbs hydrocarbon in exhaust gas; a passage switching portion that selectively closes and opens a second passage that bypasses the HC adsorption portion using a negative pressure in an intake pipe for the internal combustion engine so that the exhaust gas flows in a first passage in which the HC adsorption portion is provided, or the exhaust gas flows in the first passage and the second passage; and a control portion that controls the negative pressure in the intake pipe so that the passage switching portion closes the second passage, when a predetermined condition is satisfied at the time of start of the internal combustion engine. The control portion executes at least one of a timing advance control that advances the valve timing of an intake valve, and a throttle opening reduction control that reduces the opening amount of a throttle valve.

In the exhaust gas control apparatus for the internal combustion engine according to the first aspect, the negative pressure in the intake pipe is reliably generated so that the passage switching portion is quickly driven. Accordingly, it is possible to reliably suppress the discharge of HC at the time of start of the engine.

A second aspect of the invention relates to a method of controlling an exhaust gas control apparatus for an internal combustion engine, which includes an exhaust gas purification catalyst device provided in an exhaust passage for the internal combustion engine; and an HC adsorption portion, provided in the exhaust passage, which adsorbs hydrocarbon in exhaust gas; the method including selectively closing and opening a second passage that bypasses the HC adsorption portion using a negative pressure in an intake pipe for the internal combustion engine so that the exhaust gas flows in a first passage in which the HC adsorption portion is provided, or the exhaust gas flows in the first passage and the second passage. The method includes executing at least one of a timing advance control that advances the valve timing of an intake valve, and a throttle opening reduction control that reduces the opening amount of a throttle valve so that the second passage is closed, when a predetermined condition is satisfied at the time of start of the internal combustion engine.

A third aspect of the invention relates to an exhaust gas control apparatus for an internal combustion engine, which includes an exhaust gas purification catalyst device provided in an exhaust passage for the internal combustion engine; an HC adsorption portion, provided in the exhaust passage, which adsorbs hydrocarbon in exhaust gas; a passage switching portion that selectively switches a flow passage for the exhaust gas between a first passage in which the HC adsorption portion is provided, and a second passage that bypasses the HC adsorption portion, using a negative pressure in an intake pipe for the internal combustion engine; and a control portion that controls the negative pressure in the intake pipe so that the passage switching portion switches the flow passage for the exhaust gas to the first passage by closing the second passage, when a predetermined condition is satisfied at the time of start of the internal combustion engine. The control portion executes at least one of a timing advance control that advances the valve timing of an intake valve, and a throttle opening reduction control that reduces the opening amount of a throttle valve.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, an embodiment of the invention will be described with reference to the drawings.

Figure 1:
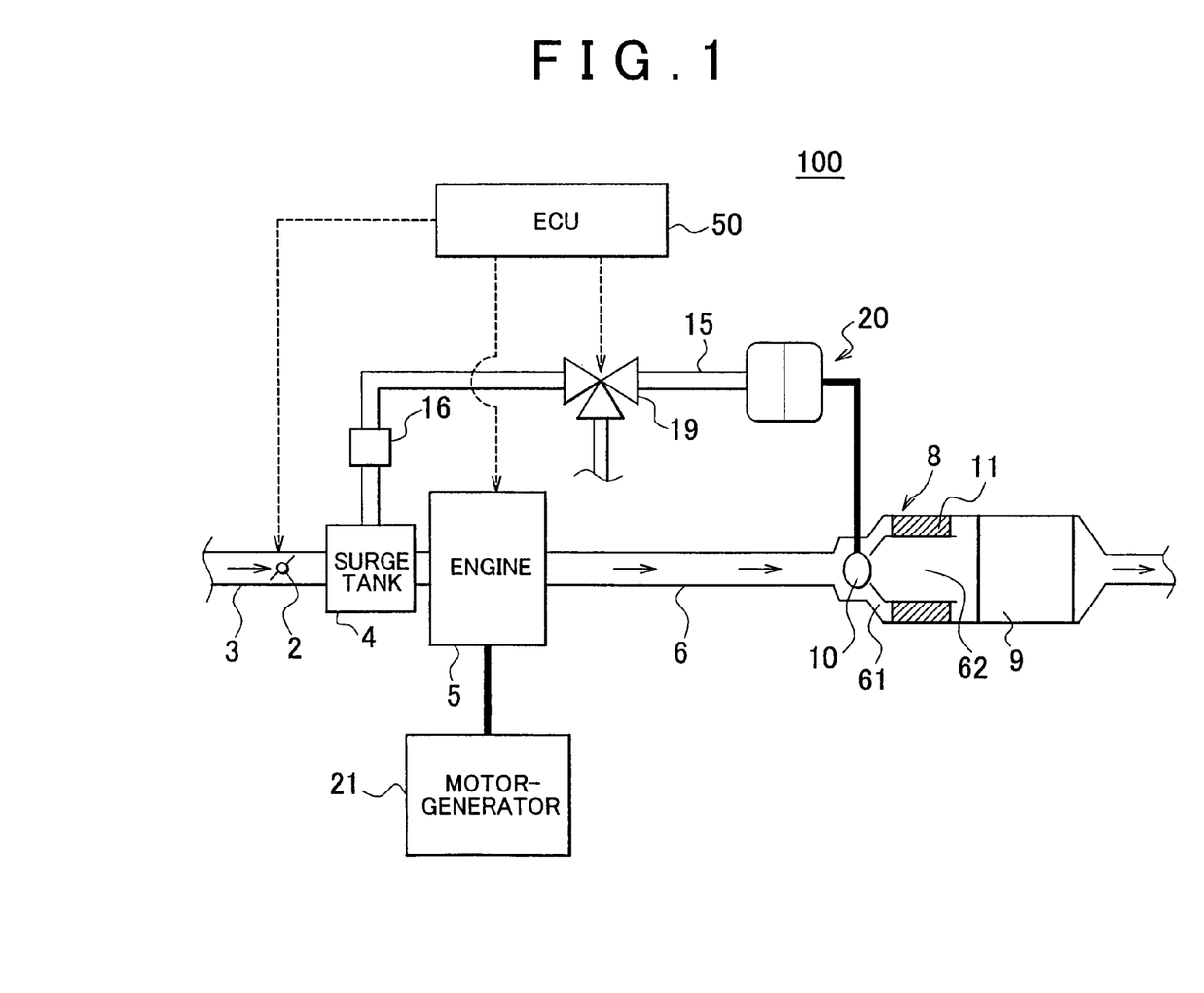
FIG. 1 is a schematic diagram showing the entire configuration of a vehicle to which an exhaust gas control apparatus for an internal combustion engine according to an embodiment of the invention is applied.

FIG. 1 is a schematic diagram showing the entire configuration of a vehicle 100 to which an exhaust gas control apparatus for an internal combustion engine according to the embodiment is applied. In FIG. 1, the solid arrows show an example of the flow of gas. The dash arrows show the input/output of signals.

The vehicle 100 includes a throttle valve 2, an intake passage (intake pipe) 3, a surge tank 4, an engine (internal combustion engine) 5, an exhaust passage 6, an HC (hydrocarbon) adsorption device 8, a catalyst 9, a switching valve 10, a negative pressure supply passage 15, a check valve 16, a three-way VSV (Vacuum Switching Valve) 19, a diaphragm mechanism 20, a motor-generator 21, and an ECU (Electronic Control Unit) 50. The vehicle 100 is configured as, for example, a hybrid vehicle.

Intake air is introduced from the outside into the intake passage 3, and passes through the intake passage 3. The throttle valve 2 adjusts the flow amount of intake air that passes through the intake passage. After the intake air is introduced into the surge tank 4, the intake air is supplied to the engine 5. The engine 5 includes a plurality of cylinders. The mixture of the supplied intake air and fuel is burned in a combustion chamber so that power is generated. In the engine 5, a fuel injection amount and an ignition timing are controlled by control signals supplied from the ECU 50. The engine 5 also includes an intake valve (not shown) that controls the flow of the gas into each cylinder, and an exhaust valve (not shown) that controls the discharge of the gas generated in each cylinder. The opening/closing timings (valve timings) of the intake valve and the exhaust valve are controlled by control signals supplied from the ECU 50.

The exhaust gas discharged from the engine 5 flows in the exhaust passage 6. In the exhaust passage 6, the HC adsorption device 8, and the catalyst 9 are provided in a direction from an upstream side to a downstream side. The catalyst 9 (exhaust gas purification catalyst device) is constituted by a three-way catalyst or an NOx storage catalyst. The catalyst 9 purifies HC, NOx, and SOx in the exhaust gas. A three-way catalyst may be further provided in a portion of the exhaust passage 6 upstream of the catalyst 9 (more specifically, in the portion of the exhaust passage 6 upstream of the HC adsorption device 8).

The HC adsorption device 8 is configured to be tubular. In the HC adsorption device 8, a first passage 61, and a second passage 62 are formed. The switching valve 10 is disposed inside the HC adsorption device 8. An HC adsorption portion 11 (shown by hatching in FIG. 1) is disposed in the first passage 61. The HC adsorption portion 11 has the function of adsorbing HC (hydrocarbon) that is an unburned component contained in the exhaust gas. The switching valve 10 selectively closes and opens the second passage 62 that bypasses the HC adsorption portion 11 so that the exhaust gas flows in the first passage 61, or the exhaust gas flows in the first passage 61 and the second passage 62. More specifically, when the switching valve 10 is closed, the exhaust gas flows only in the first passage 61. When the switching valve 10 is open, the exhaust gas flows in the first passage 61 and the second passage 62. The opening/closing of the switching valve 10 is controlled by a diaphragm mechanism 20 described below.

The basic idea regarding the opening/closing of the switching valve 10 will be described. The catalyst 9 cannot effectively purify HC in the exhaust gas, for example, at the time of cold start. Therefore, at the time of cold start, the switching valve 10 is closed to make the exhaust gas flow only in the first passage 61 so that the HC adsorption portion 11 adsorbs the HC. The HC adsorption portion 11 has a characteristic of starting to discharge the adsorbed HC to the outside when the temperature of the exhaust gas is increased. Therefore, when the temperature of the exhaust gas reaches a temperature at which the adsorbed HC is purged (at this time, the catalyst 9 is substantially activated), the switching valve 10, which has been closed, is opened to make the exhaust gas flow in the second passage 62.

Next, the mechanism that controls the opening/closing of the switching valve 10 will be described. The opening/closing of the switching valve 10 is controlled by the diaphragm mechanism 20. More specifically, the operation of the diaphragm mechanism 20 is controlled by the pressure of gas supplied via the negative pressure supply passage 15.

The negative pressure supply passage 15 connects the surge tank 4 and the diaphragm mechanism 20. In the negative pressure supply passage 15, the check valve 16, and the three-way VSV 19 are provided in a direction from the surge tank 4 to the diaphragm mechanism 20. The check valve 16 is a one-way valve that allows only the flow of the gas from the negative pressure supply passage 15 to the surge tank 4. The three-way VSV 19 is constituted by a so-called three-way valve. The three-way VSV 19 has an opening portion connected to the check valve 16, an opening portion connected to the diaphragm mechanism 20, and an opening portion that is opened to the atmosphere. The three-way VSV 19 is controlled by a control signal supplied from the ECU 50.

The diaphragm mechanism 20 controls the opening/closing of the switching valve 10 according to the pressure of the supplied gas. More specifically, the pressure inside the diaphragm mechanism 20 is maintained at the atmospheric pressure. The diaphragm mechanism 20 operates according to the difference between the pressure of the supplied gas and the atmospheric pressure inside the diaphragm mechanism 20. More specifically, when the atmospheric pressure is introduced into the diaphragm mechanism 20, the diaphragm mechanism 20 operates to open the switching valve 10. When the negative pressure (that is regarded as the negative pressure in the intake pipe), which is lower than the atmospheric pressure, is introduced into the diaphragm mechanism 20, the diaphragm mechanism 20 operates to close the switching valve 10. Thus, the switching valve 10, the diaphragm mechanism 20, and the three-way VSV 19 operate as the flow passage switching portion according to the invention.

A motor-generator 21 is configured to function mainly as a motor that assists the output of the engine 5. The motor-generator 21 is connected to the engine 5 via a planetary gear (not shown) and the like.

The ECU 50 includes a CPU, ROM, RAM, an AD converter, and an input/output interface (all of them are not shown). The ECU 50 controls the three-way VSV 19, thereby controlling the pressure of the gas supplied to the diaphragm mechanism 20 to control the opening/closing of the switching valve 10. In the embodiment, when the engine 5 starts, the ECU 50 executes controls to generate the negative pressure in the intake pipe required to reliably close the switching valve 10. More specifically, the ECU 50 executes a timing advance control that advances the valve timing of the intake valve, and a control that reduces the opening amount of the throttle valve 2. Thus, the ECU 50 operates as the control portion according to the invention.

Hereinafter, a control executed by the ECU 50 when the engine 5 starts (hereinafter, referred to as "start-time control") in each of embodiments will be more specifically described.

First, the start-time control according to a first embodiment will be described. In the first embodiment, at the time of cold start, the ECU 50 executes the timing advance control that advances the valve timing of the intake valve of the engine 5. The timing advance control is executed to quickly generate the negative pressure in the intake pipe so that the diaphragm mechanism 20 operates to completely close the switching valve 10. That is, the ECU 50 executes the timing advance control that advances the valve timing of the intake valve, to completely close the switching valve 10 quickly so that the discharge of the HC is reliably suppressed at the time of cold start.

Figure 2:
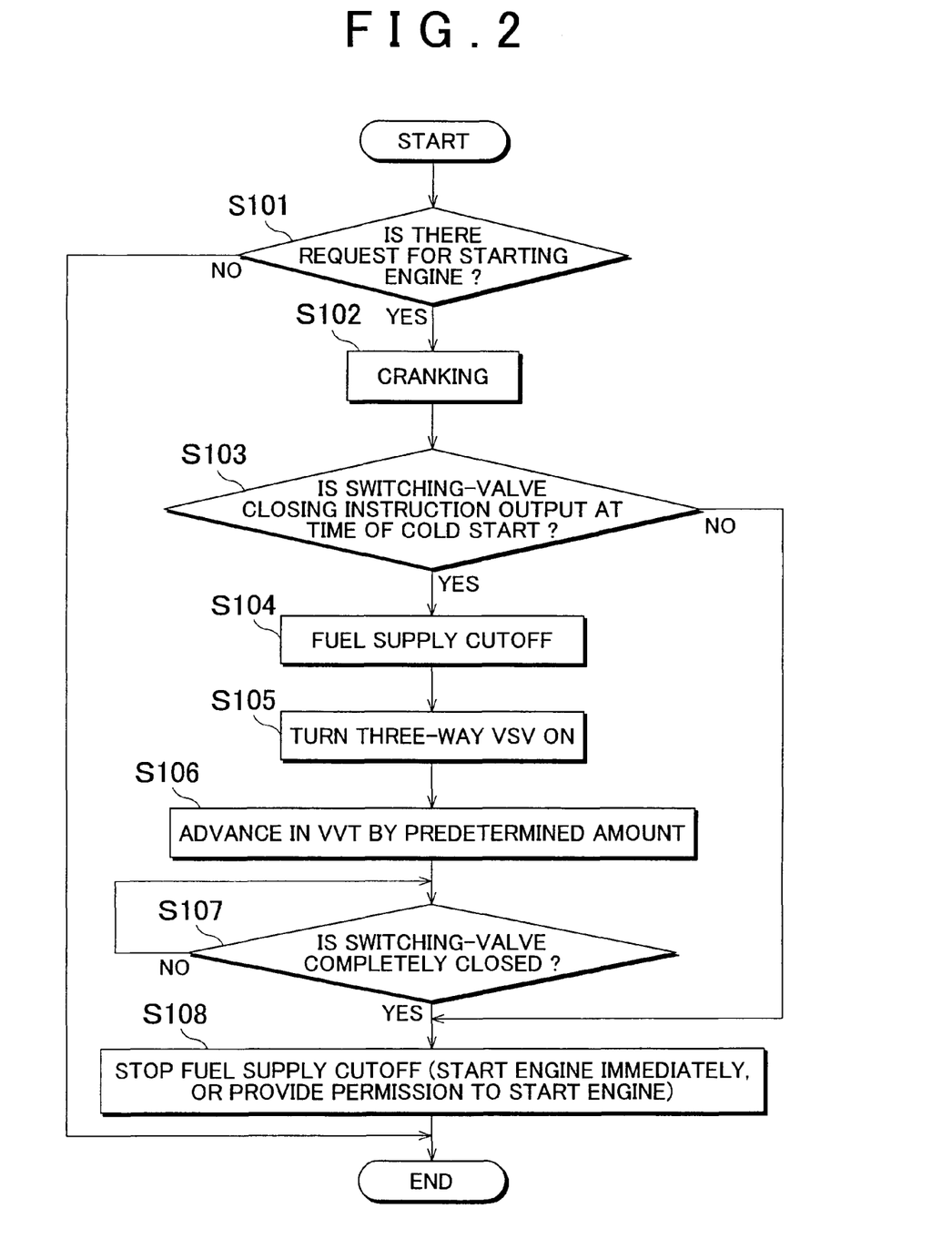
FIG. 2 is a flowchart showing a start-time control according to a first embodiment of the invention.

The start-time control according to the first embodiment will be more specifically described with reference to FIG. 2. FIG. 2 is a flowchart showing the start-time control according to the first embodiment. The routine is repeatedly executed by the ECU 50.

First, in step S101, the ECU 50 determines whether there is a request for starting the engine 5. For example, the ECU 50 determines whether there is a request for starting the engine 5, by determining whether an ignition switch (IG) is on. When there is a request for starting the engine 5 (YES in step S101), the routine proceeds to step S102. When there is no request for starting the engine 5 (NO in step S101), the routine ends.

In step S102, the ECU 50 cranks the engine 5 using the motor-generator 21. In other words, the ECU 50 controls the motor-generator 21, thereby assisting the start of the engine 5. Thus, because the ECU 50 cranks the engine 5 using the motor generator 21, a decrease in the startability is suppressed when the fuel supply is cut off in the later process (i.e., the process in step S104). After the above-described process in step S102 is finished, the routine proceeds to step S103.

In step S103, the ECU 50 determines whether an instruction for closing the switching valve 10 (hereinafter, referred to as "switching-valve closing instruction") is output at the time of cold start. That is, the ECU 50 determines whether the exhaust gas should be supplied to the HC adsorption portion 11 so that the HC adsorption portion 11 adsorbs the HC. More specifically, the ECU 50 makes the determination based on the temperature of a coolant for cooling the engine 5 (hereinafter, simply referred to as "coolant temperature"), and/or the temperature of intake air. For example, when the coolant temperature is equal to or below a predetermined temperature, it is considered that the switching-valve closing instruction should be output. When the coolant temperature is above the predetermined temperature, it is considered that the switching-valve closing instruction should not be output. When the engine 5 is in a cold start state, and the switching-valve closing instruction is output (YES in step S103), the routine proceeds to step S104. When the engine 5 is not in the cold start state and/or the switching-valve closing instruction is not output (NO in step S103), the routine proceeds to step S108.

In step S104, the ECU 50 cuts off fuel supply. That is, the ECU 50 prohibits injection in the engine 5. In this case, it is considered that the engine 5 is in the cold start state, and the switching valve 50 is not completely closed yet. Therefore, if the fuel is injected, there is a high possibility that the HC generated by combustion may not be reliably adsorbed by the HC adsorption portion 11, and the HC may be discharged. Accordingly, in step S104, the fuel supply is cut off to suppress the discharge of the HC until the switching valve 10 is completely closed. After the above-described process in step S104 is finished, the routine proceeds to step S105. In step S104, the ECU 50 may prohibit ignition, in addition to the fuel supply cutoff.

In step S105, the ECU 50 turns the three-way VSV 19 on. In this case, the ECU 50 executes the control to close the switching valve 10 to supply the exhaust gas to the HC adsorption portion 11. More specifically, the ECU 50 controls the three-way VSV 19, thereby operating the diaphragm mechanism 20 to control the switching valve 10. More specifically, the ECU 50 supplies the control signal to the three-way VSV 19 so that the negative pressure in the intake pipe is introduced into the diaphragm mechanism 20. After the above-described process in step S105 is finished, the routine proceeds to step S106.

In step S106, the ECU 50 executes the control that advances the valve timing (IN VVT) of the intake valve of the engine 5. The control is executed to quickly generate the negative pressure in the intake pipe. That is, the ECU 50 executes the control to quickly generate the negative pressure in the intake pipe so that the switching valve 10 is completely closed quickly. More specifically, the ECU 50 supplies the control signal to a mechanism that opens/closes the intake valve, thereby advancing the valve timing of the intake valve by a predetermined amount. The predetermined amount is set beforehand, according to the type of the vehicle, and the like. After the above-described process in step S106 is finished, the routine proceeds to step S107.

In step S107, the ECU 50 determines whether the switching valve 10 is completely closed. For example, the ECU 50 determines whether the switching valve 10 is completely closed by estimating the negative pressure in the intake pipe. In this case, the negative pressure in the intake pipe is estimated based on the rotational speed of the engine 5, the valve timing of the intake valve, and the like. When the switching valve 10 is completely closed (YES in step S107), the routine proceeds to step S108. When the switching valve 10 is not completely closed (NO in step S107), the routine returns to step S107. That is, the ECU 50 repeatedly makes the determination in step S107 while the engine continues to be cranked, the fuel supply continues to be cut off, and the valve timing of the intake valve remains advanced, until the switching valve 10 is completely closed.

In step S108, because the ECU 50 is completely closed, the ECU 50 stops the fuel supply cutoff. More specifically, the ECU 50 starts the engine 5 immediately, or provides permission to start the engine 5. When the engine 5 is started immediately, the ECU 50 performs fuel injection and ignition, thereby starting the engine 5. After the above-described process in step S108 is finished, the routine ends.

By executing the control according to the first embodiment described above, it is possible to reliably generate the negative pressure in the intake pipe so that the switching valve 10 is completely closed quickly. Thus, it is possible to reliably suppress the discharge of the HC at the time of engine start. Also, because the time required to completely close the switching valve 10 is reduced, the engine 5 is quickly started.

Next, a start-time control according to a second embodiment will be described.

In the second embodiment, the timing advance control that advances the valve timing of the intake valve is executed, as in the first embodiment. However, the second embodiment differs from the first embodiment in that the timing advance control is executed based on the rotational speed of the engine 5. More specifically, in the second embodiment, an advance amount, by which the valve timing of the intake valve is advanced, is changed based on the rotational speed of the engine 5. More specifically, when the rotational speed of the engine 5 is below a predetermined value, the advance amount, by which the valve timing of the intake valve is advanced, is set to a small amount. For example, the advance amount is set to prevent the occurrence of a start shock.

The above-described control is executed for the following reason. If the valve timing of the intake valve is advanced when the rotational speed of the engine 5 is relatively low, a start shock may occur due to pumping loss or the like. Accordingly, in the second embodiment, when the rotational speed of the engine 5 is relatively low, the advance amount, by which the valve timing of the intake valve is advanced, is set to a small amount, to suppress the occurrence of such a start shock. Thus, in the second embodiment, the control is executed to suppress the occurrence of a start shock, and to suppress the discharge of the HC.

Figure 3A:
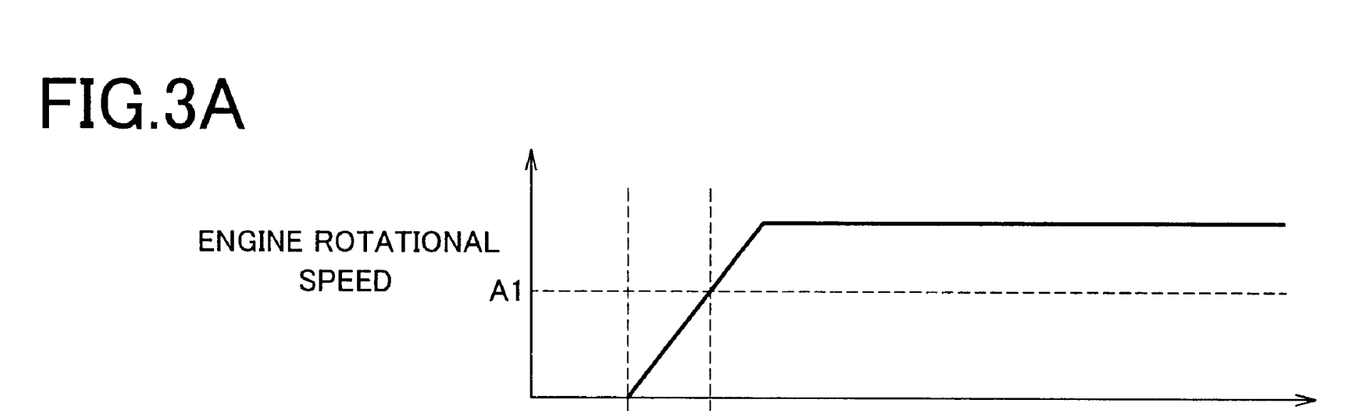
FIGS. 3A and 3B are diagrams explaining the outline of a control according to a second embodiment of the invention.
Figure 3B:
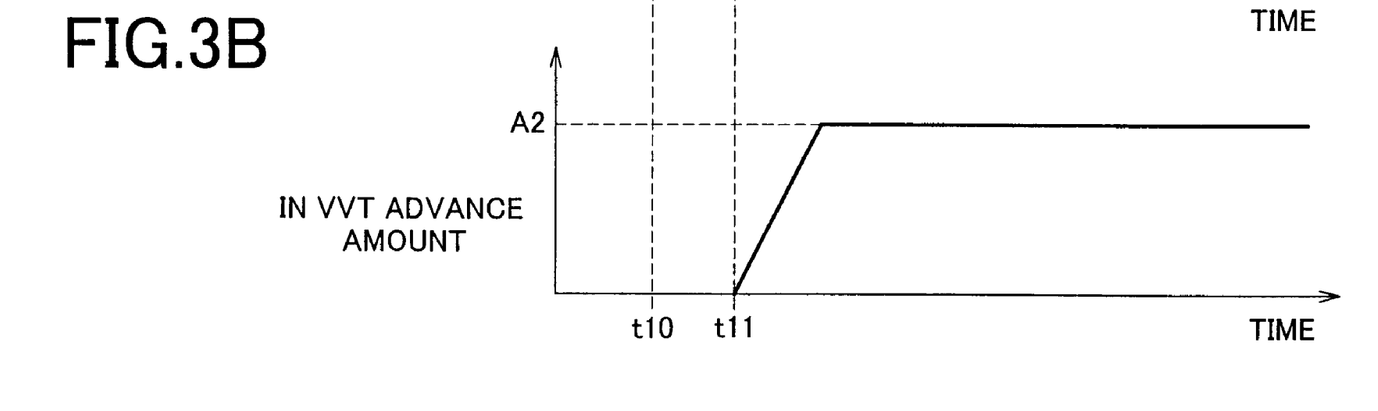

An example of the start-time control according to the second embodiment will be described with reference to FIGS. 3A and 3B. FIG. 3A shows an example of a time-dependent change in the engine rotational speed. FIG. 3B shows a time-dependent change in the advance amount by which the valve timing (IN VVT) of the intake valve is advanced.

The engine rotational speed starts to increase at time t10. In this case, the ECU 50 does not advance the valve timing of the intake valve until the engine rotational speed exceeds a resonance band where a start shock may occur. The resonance band is a region near a rotational speed A1 (equivalent to the predetermined value). More specifically, the ECU 50 does not advance the valve timing of the intake valve during a period from time t10 to time t11. Because the engine rotational speed exceeds the resonance band at time t11, the ECU 50 starts to advance the valve timing of the intake valve at time t11. In this case, the ECU 50 increases the advance amount to a predetermined amount A2, and then maintains the advance amount at the predetermined amount A2. In other words, the ECU 50 executes the timing advance control so that the advance amount does not exceed the predetermined amount A2. The predetermined amount A2 is set beforehand, according to the type of the vehicle, and the like.

Figure 4:
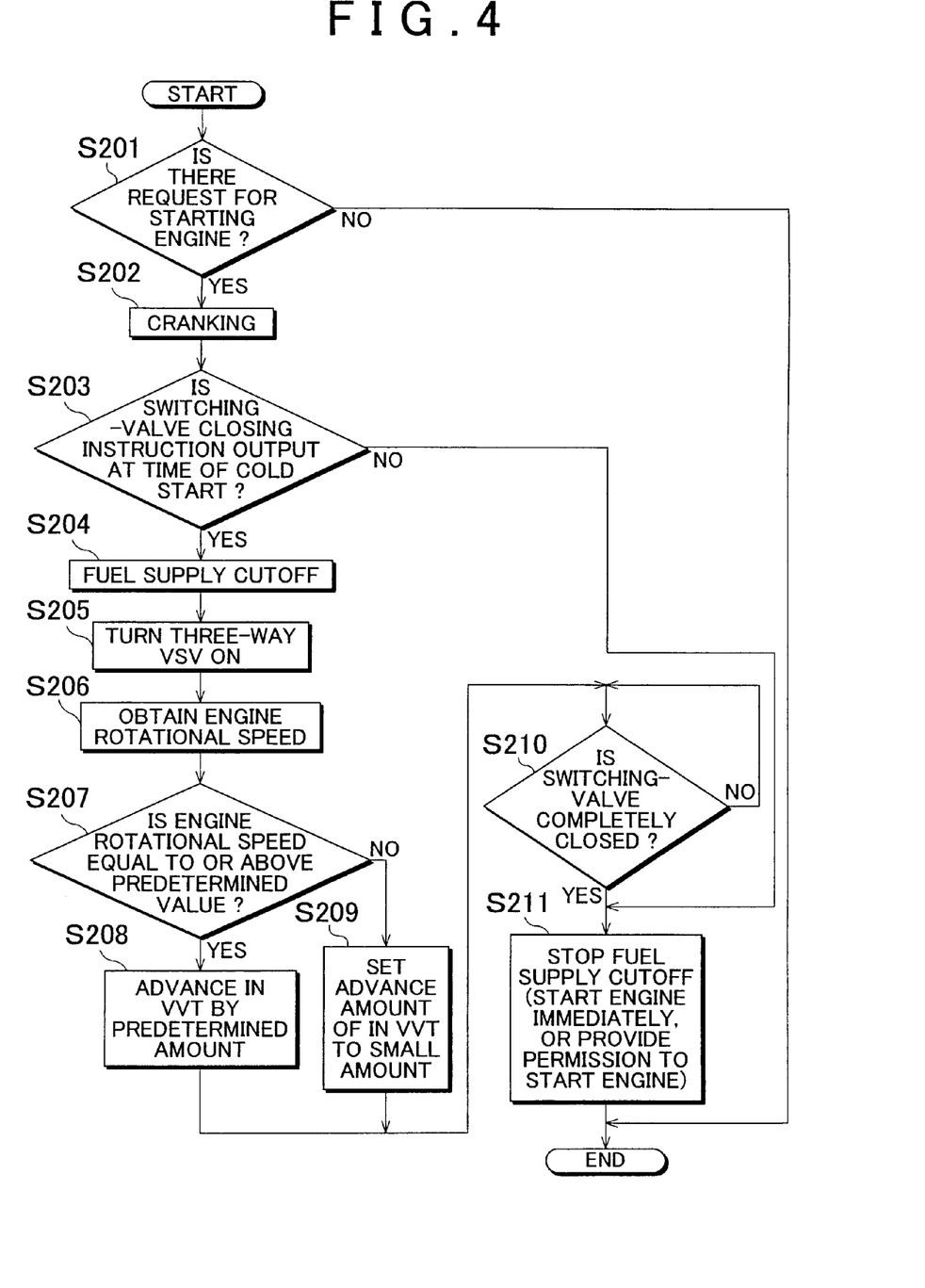
FIG. 4 is a flowchart showing a start-time control according to the second embodiment of the invention.

FIG. 4 is a flowchart showing the start-time control according to the second embodiment. This routine is also repeatedly executed by the ECU 50. Processes in steps S201 to S205 in FIG. 4 are the same as the processes in steps S101 to S105 in FIG. 2. Processes in steps S210 and S211 in FIG. 4 are the same as the processes in steps S107 and S108 in FIG. 2. Therefore, description of these steps in FIG. 4 will be omitted. Thus, processes in steps S206 to S209 will be described in detail.

The processes in steps S206 to S209 are executed to determine the advance amount by which the valve timing of the intake valve is advanced. First, in step S206, the ECU 50 obtains the engine rotational speed. In this case, the ECU 50 obtains the engine rotational speed from, for example, a rotational speed sensor provided in the engine 5. Then, the routine proceeds to step S207.

In step S207, the ECU 50 determines whether the engine rotational speed is equal to or above the predetermined value. In other words, the ECU 50 determines whether the engine rotational speed exceeds the resonance band where a start shock may occur. The process in step S207 is executed to determine the advance amount by which the valve timing of the intake valve is advanced, by determining whether there is a possibility that a start shock may occur. When the engine rotational speed is equal to or above the predetermined value (YES in step S207), the routine proceeds to step S208. When the engine rotational speed is below the predetermined value (NO in step S207), the routine proceeds to step S209.

In step S208, because the engine rotational speed is equal to or above the predetermined value, there is little possibility that a start shock may occur if the valve timing is advanced, and therefore, the ECU 50 advances the valve timing (IN VVT) of the intake valve by the predetermined amount. In other words, in this case, because there is little possibility that a start shock may occur, the ECU 50 executes the process to give priority to quick generation of the negative pressure in the intake pipe. The predetermined amount, by which the valve timing is advanced, is set beforehand to an advance amount required to reduce emissions, according to the type of the vehicle, and the like. After the process in step S208 is finished, the routine proceeds to step S210.

In step S209, because the engine rotational speed is below the predetermined value, there is a high possibility that a start shock may occur if the valve timing is advanced, and therefore, the ECU 50 sets the advance amount, by which the valve timing (IN VVT) of the intake valve is advanced, to an amount that is smaller than the predetermined amount. More specifically, the ECU 50 sets the advance amount to prevent the occurrence of a start shock. Thus, in step S209, the process is executed to give priority to the suppression of a start shock. Instead of setting the advance amount, by which the valve timing of the intake valve is advanced, to a small amount, the advance amount may be set to substantially zero to reliably suppress the occurrence of a start shock. After the process in step S209 is finished, the routine proceeds to step S210.

In step S210, the ECU 50 determines whether the switching valve 10 is completely closed, as in the process in step S107 described above. When the switching valve 10 is completely closed (YES in step S210), the routine proceeds to step S211. When the switching valve 10 is not completely closed (NO in step S210), the routine returns to step S210. That is, the ECU 50 repeatedly makes the determination in step S210 while the engine 5 continues to be cranked, the fuel supply continues to be cut off, and the valve timing of the intake valve remains advanced, until the switching valve 10 is completely closed. In step S211, the ECU 50 stops the fuel supply cutoff, as in the process in step S108. More specifically, the ECU 50 starts the engine 5 immediately, or provides permission to start the engine 5. After the above-described process in step S211 is finished, the routine ends.

By executing the control according to the second embodiment described above, it is possible to appropriately suppress the occurrence of a start shock, and to suppress the discharge of the HC at the time of engine start.

Next, a start-time control according to a third embodiment will be described.

The third embodiment differs from the first embodiment and the second embodiment in that the control that reduces the opening amount of the throttle valve 2 (hereinafter, referred to as "throttle opening reduction control") is executed, along with the timing advance control. The timing advance control and the throttle opening reduction control are executed to quickly generate the negative pressure in the intake pipe so that the diaphragm mechanism 20 operates to completely close the switching valve 10. That is, the timing advance control and the throttle opening reduction control are executed to completely close the switching valve 10 quickly so that the discharge of the HC is reliably suppressed.

Figure 5:
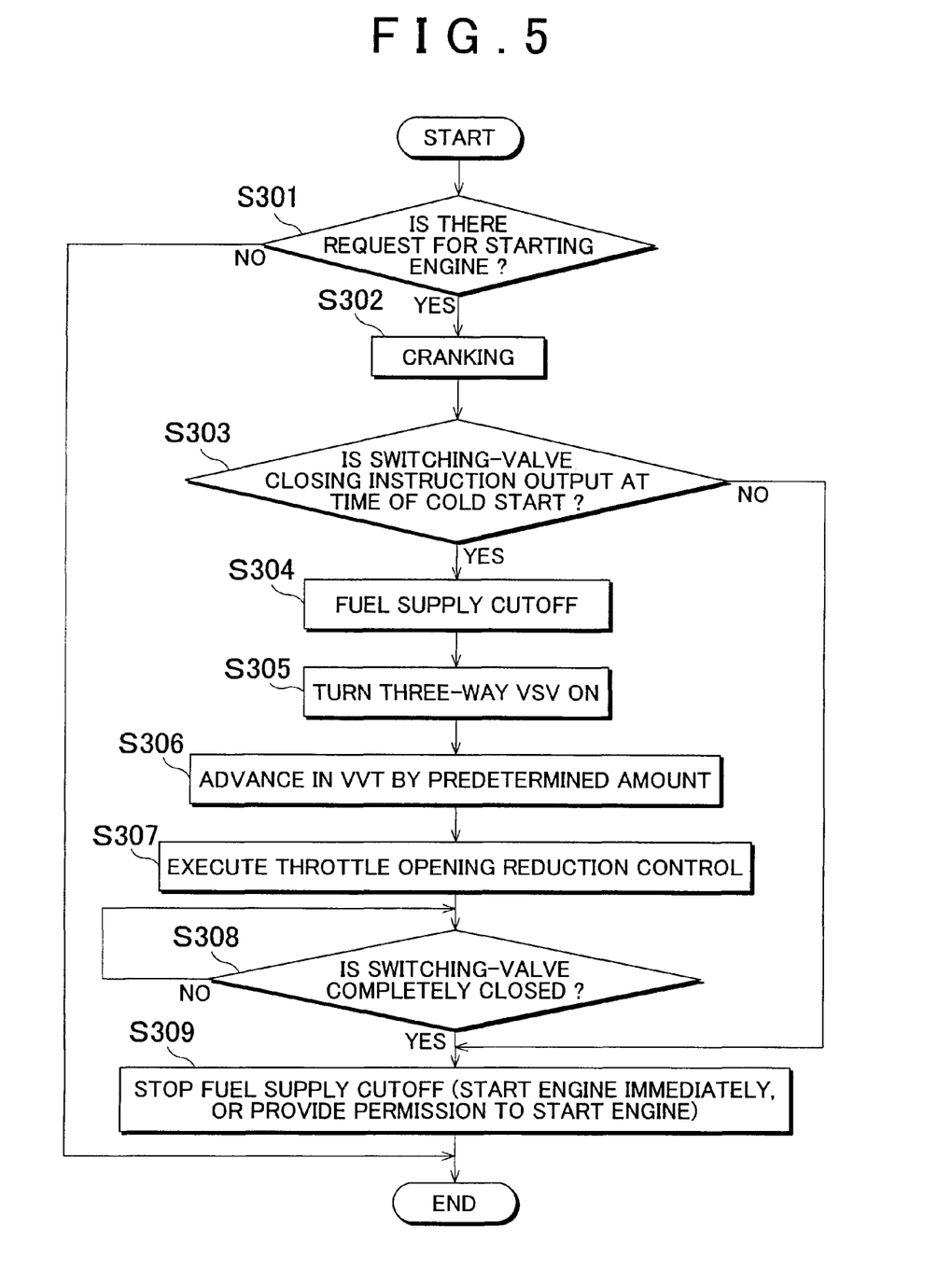
FIG. 5 is a flowchart showing a start-time control according to a third embodiment of the invention.

FIG. 5 is a flowchart showing the start-time control according to the third embodiment. This routine is also repeatedly executed by the ECU 50. Processes in steps S301 to S306 in FIG. 5 are the same as the processes in steps S101 to S106 in FIG. 2. Processes in steps S308 and S309 are the same as the processes in steps S107 and S108 in FIG. 2. Therefore, description of these steps in FIG. 5 will be omitted. Thus, the process in step S307 will be more specifically described.

In step S307, the ECU 50 executes the throttle opening reduction control that reduces the opening amount of the throttle valve 2. More specifically, the ECU 50 determines a reduction amount by which the opening amount of the throttle valve 2 is reduced, based on the coolant temperature, and the like. Then, the ECU 50 executes the control for the throttle valve 2 so that the opening amount of the throttle valve 2 is set to an opening amount corresponding to the determined reduction amount. After the above-described process in step S307 is finished, the routine proceeds to step S308.

In step S308, the ECU 50 determines whether the switching valve 10 is completely closed, as in the process in step S107. When the switching valve 10 is completely closed (YES in step S308), the routine proceeds to step S309. When the switching valve 10 is not completely closed (NO in step S308), the routine returns to step S308. That is, the ECU 50 repeatedly makes the determination in step S308 while the engine 5 continues to be cranked, the fuel supply continues to be cut off, the valve timing of the intake valve remains advanced, and the opening amount of the throttle valve 2 remains reduced, until the switching valve 10 is completely closed. Then, in step S309, the ECU 50 stops the fuel supply cutoff, as in the process in step S108. More specifically, the ECU 50 starts the engine 5 immediately, or provides permission to start the engine 5. After the above-described process in step S309 is finished, the routine ends.

By executing the control according to the third embodiment described above, it is possible to reliably generate the negative pressure in the intake pipe so that the switching valve 10 is completely closed quickly. Thus, it is possible to reliably suppress the discharge of the HC at the time of engine start. Also, by reducing the opening amount of the throttle valve 2, the amount of new intake air is reduced, and therefore, the amount of exhaust gas tends to be reduced. Therefore, it is possible to reduce emissions.

In the routine shown in FIG. 5, the timing advance control is executed without taking into account the rotational speed of the engine 5. Instead, the timing advance control may be executed so that the advance amount is changed based on the rotational speed of the engine 5, as in the second embodiment. In this case, instead of the process in step S306, the processes in steps S206 to S209 in FIG. 4 may be executed.

The embodiment where both of the timing advance control and the throttle opening reduction control are executed has been described. Instead, only the throttle opening reduction control may be executed.

What is claimed is:

1. An exhaust gas control apparatus for an internal combustion engine, comprising:
    an exhaust gas purification catalyst device provided in an exhaust passage of the internal combustion engine;
    an HC adsorption portion, provided in the exhaust passage, which absorbs hydrocarbon in exhaust gas;
    passage switching means for switching a passage through which the exhaust gas flows between a passage in which the HC absorption portion is provided, and a passage that bypasses the HC absorption portion, using a negative pressure in an intake pipe of the internal combustion engine; and
    intake pipe negative pressure control means for controlling the negative pressure in the intake pipe to operate the passage switching means by executing at least one of a timing advance control that advances a valve timing of an intake valve, and a control that reduces an opening amount of a throttle valve, at a time of start of the internal combustion engine,
    wherein when the rotational speed of the internal combustion engine is below a predetermined value, the intake pipe negative pressure control means sets the advance amount, by which the valve timing of the intake valve is advanced, to substantially zero, or a value smaller than a value to which the advance amount is set when the rotational speed of the internal combustion engine is equal to or above the predetermined value, and
    wherein the exhaust gas control apparatus includes means for cutting off fuel supply during a period from when operation of the passage switching means starts, until when the passage switching means completes switching of the passage through which the exhaust gas flows.

2. The exhaust gas control apparatus according to claim 1, further comprising:
    means for cutting off fuel supply and prohibiting ignition during the period from when the operation of the passage switching means starts, until when the passage switching means completes switching of the passage through which the exhaust gas flows.

3. The exhaust gas control apparatus according to claim 1, further comprising:
    means for assisting the start of the internal combustion engine by cranking the internal combustion engine during the period from when the operation of the passage switching means starts, until when the passage switching means completes switching of the passage through which the exhaust gas flows.

4. An exhaust gas control apparatus of an internal combustion engine, comprising:
    an exhaust gas purification catalyst device provided in an exhaust passage of the internal combustion engine;
    an HC absorption portion, provided in the exhaust passage, which absorbs hydrocarbon in exhaust gas;
    passage switching means for switching a passage through which the exhaust gas flows between a passage in which the hydrocarbon absorption portion is provided, and a passage that bypasses the HC absorption portion, using a negative pressure in an intake pipe for the internal combustion engine;
    intake pipe negative pressure control means for controlling the negative pressure in the intake pipe to operate the passage switching means at a time of start of the internal combustion engine; and
    a motor that assists the start of the internal combustion engine by cranking the internal combustion engine during a period from when operation of the passage switching means starts, until when the passage switching means completes switching of the passage through which the exhaust gas flows.

5. The exhaust gas control apparatus according to claim 2, further comprising:
    means for assisting the start of the internal combustion engine by cranking the internal combustion engine during the period from when the operation of the passage switching means starts, until when the passage switching means completes switching of the passage through which the exhaust gas flows.

* * * * *